US012203326B2

(12) United States Patent
Collins

(10) Patent No.: US 12,203,326 B2
(45) Date of Patent: Jan. 21, 2025

(54) RETRACTABLE SCREEN RETENTION SYSTEM

(71) Applicant: Justin R. Collins, Lavon, TX (US)

(72) Inventor: Justin R. Collins, Lavon, TX (US)

( * ) Notice: Subject to any disclaimer, the term of this patent is extended or adjusted under 35 U.S.C. 154(b) by 369 days.

(21) Appl. No.: 17/710,280

(22) Filed: Mar. 31, 2022

(65) Prior Publication Data

US 2022/0325578 A1 Oct. 13, 2022

Related U.S. Application Data

(60) Provisional application No. 63/173,123, filed on Apr. 9, 2021.

(51) Int. Cl.

| | |
|---|---|
| ***E06B 9/62*** | (2006.01) |
| ***E06B 9/42*** | (2006.01) |
| ***E06B 9/58*** | (2006.01) |
| *E06B 9/54* | (2006.01) |

(52) U.S. Cl.
CPC ................ *E06B 9/581* (2013.01); *E06B 9/42* (2013.01); *E06B 9/62* (2013.01); *E06B 9/54* (2013.01)

(58) Field of Classification Search
CPC ... E06B 9/581; E06B 9/54; E06B 9/58; E06B 2009/588; E06B 9/582; E06B 9/42
See application file for complete search history.

(56) References Cited

U.S. PATENT DOCUMENTS 3,698,036 A * 10/1972 Goodman ........... E05D 15/0665 16/100
5,392,835 A 2/1995 Wildt
6,463,983 B1 * 10/2002 Lang ......................... E06B 9/54 160/273.1
6,552,847 B2 4/2003 Congard
8,622,112 B2 1/2014 Tremaine
9,038,349 B2 5/2015 Fox
2007/0029049 A1 * 2/2007 Martineau ................. E06B 9/54 160/23.1
2012/0255687 A1 * 10/2012 Komatsu ................ E06B 9/581 160/310
2012/0325416 A1 * 12/2012 Hayashiguchi ......... E06B 9/581 160/272

(Continued)

FOREIGN PATENT DOCUMENTS

WO WO1997035642 A1 10/1997

*Primary Examiner* — Abe Massad
*Assistant Examiner* — Matthew R. Shepherd

(57) ABSTRACT

The retractable screen retention system is a guiding device for retractable screens that is sturdy, secured, and does not displace easily. To accomplish this, the system includes a track assembly, a guiding rail, and a sliding assembly. The sliding assembly further includes a retention housing and a weight bar. The design and components of the retention housing allows for movement of the weight bar and the retractable screen and yet keeps them retained in the system. Furthermore, the arrangement of the sliding assembly is designed to be flexible and doesn't allow it to come out of the track during deflective motions such as due to wind or some other physical impact. Thus, the system provides a track assembly with a guiding channel for the retractable screen that prevents the displacement of the retractable screen from the track while providing flexibility.

17 Claims, 12 Drawing Sheets

(56) References Cited

U.S. PATENT DOCUMENTS

| | | | | |
|---|---|---|---|---|
| 2013/0068400 | A1* | 3/2013 | Dwarka | E06B 9/58<br>160/271 |
| 2015/0240551 | A1* | 8/2015 | Murray | E06B 9/582<br>16/96 D |
| 2018/0023341 | A1* | 1/2018 | Lombardini | E06B 9/58<br>160/368.1 |
| 2018/0230738 | A1* | 8/2018 | Motosko | E06B 9/581 |
| 2019/0257148 | A1* | 8/2019 | Healam | E06B 9/54 |

* cited by examiner

RETRACTABLE SCREEN RETENTION SYSTEM

FIELD OF THE INVENTION

The present invention relates to track assemblies. More specifically, the present invention is a track assembly and guide retention system for retractable screens.

BACKGROUND OF THE INVENTION

Guide systems for retractable screens has been utilized for decades as they provide a wide range of utility and functionality. Track retention systems involving retractable screens allow users to enclose and surround an area desired to keep insects out and/or to control the climate. Usage of track retention systems may vary depending on the situation and preferred use of the user. One issue with existing track retention systems for retractable screens is mechanically being too loose and not secured in a track which causes the retractable screen to completely be displaced easily and/or accidentally.

SUMMARY

An objective of the present invention is to provide a retention system for retractable screens that is sturdy, secured, and does not displace easily. Further, it is an aim of the present invention to provide a flexible and versatile retractable screen retention system as well. To accomplish this, the present invention comprises a track assembly, a guiding rail, and a sliding assembly. According to the present invention, the sliding assembly comprises a retention housing and a weight bar. The design and components of the retention housing allows movement of the weight bar and a retractable screen and yet keeps them retained in the system. Further, the arrangement of the sliding assembly is designed to be flexible and doesn't allow it to come out of the track during deflective motions such as due to wind or some other physical impact. To that end, the present invention provides a track assembly with a guiding channel for the retractable screen that prevents the displacement of a retractable screen from the track. Thus, the present invention provides a sturdy yet flexible guiding system for retractable screens.

DETAILED DESCRIPTIONS OF THE INVENTION

All illustrations of the drawings are for the purpose of describing selected versions of the present invention and are not intended to limit the scope of the present invention.

In reference to FIG. 1 through FIG. 12, the present invention is a retractable screen retention system. An objective of the present invention is to provide a retention system for retractable screens that is sturdy, secured, and does not displace easily. Further, it is an aim of the present invention to provide a flexible and versatile retractable screen retention system. To accomplish this, the present invention comprises a track assembly, a guiding rail, and a sliding assembly. According to the present invention, the sliding assembly comprises a retention housing and a weight bar. The design and components of the retention housing allows movement of the weight bar and a retractable screen and yet keeps them retained in the system. Further, the arrangement of the sliding assembly is designed to be flexible and doesn't allow it to come out of the track during deflective motions such as due to wind or some other physical impact. To that end, the present invention provides a track assembly with a guiding channel for the retractable screen that prevents the displacement of a retractable screen from the track. Thus, the present invention provides a sturdy yet flexible guiding system for retractable screens.

Figure 1:
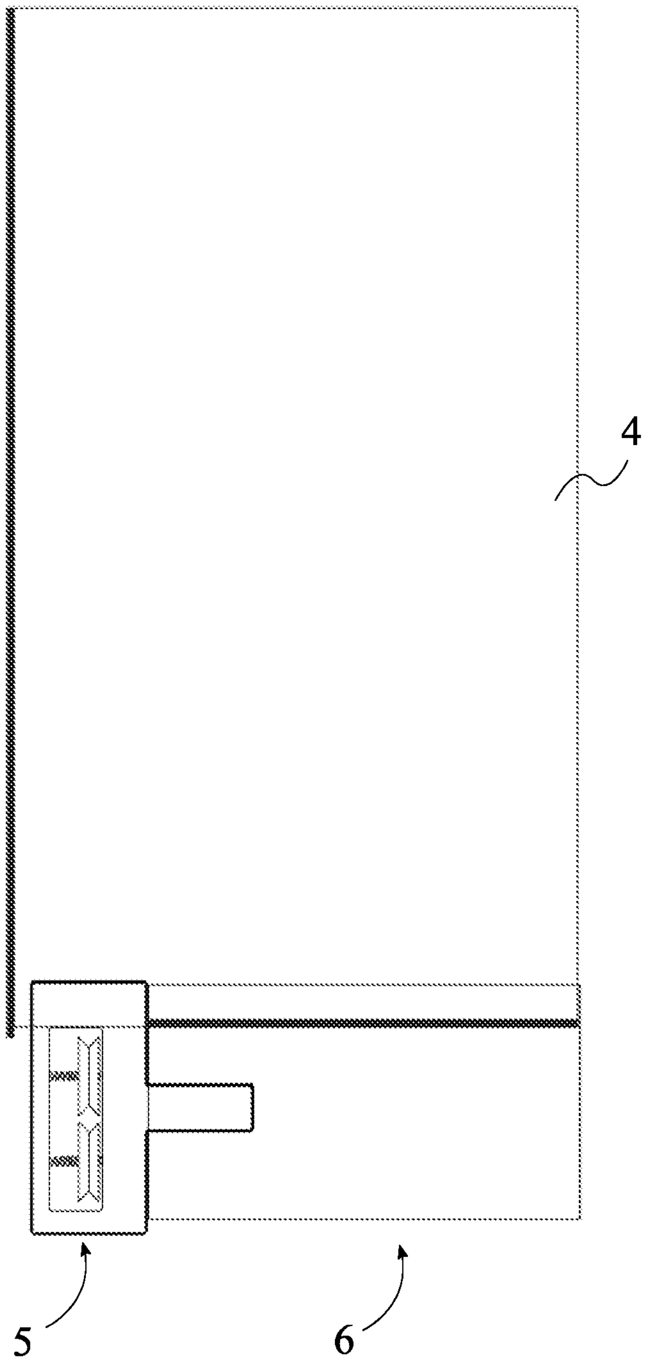
FIG. 1 is a schematic front view of the present invention.
Figure 2:
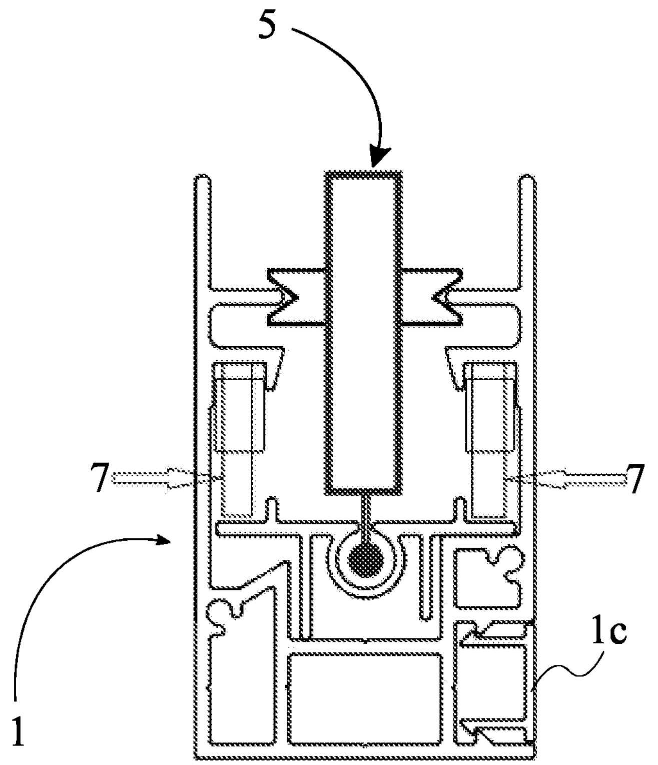
FIG. 2 is a schematic bottom plan view of the present invention without a weight bar.

The following description is in reference to FIG. 1 through FIG. 12. According to a preferred embodiment, the present invention comprises a track assembly 1, a guiding rail 2, a sliding assembly 3, and a screen 4. In the preferred embodiment, the track assembly 1 is a structure consisting of a unique design of rails as can be seen in FIG. 2. The track assembly 1 is utilized as a frame and boundary for the maneuver and motion of the sliding assembly 3. Further, the track assembly 1 houses the guiding rail 2. More specifically, the guiding rail 2 is detachably mounted within the track assembly 1, and the guiding rail 2 is positioned centrally across a width of the track assembly 1. Preferably, the guiding rail 2 is a kedar rail. However, the guiding rail 2 may comprise any other guiding technology, size, shape, components, arrangement of components etc. that are known to one of ordinary skill in the art, as long as the intents of the present invention are not altered. The guiding rail 2 is a structure utilized to assist with the boundary for the maneuver and motion of components of the screen. To that end, the sliding assembly 3 comprises a retention housing 5 and a weight bar 6. As seen in FIG. 1 through FIG. 8, the retention housing 5 is a component that is utilized as a maneuver gear which allow the primary motion of the retention system of the present invention. Accordingly, the retention housing 5 is inserted into the uniquely structured track assembly 1, such that the retention housing 5 is slidably mounted along a length of the track assembly 1. The weight bar 6 is a component of the present invention that assists with the management and performance of the retention system. The weight bar 6 is an elongated structure with a hollow section, and the weight bar 6 is detachably connected to a terminal end of the retention housing 5, opposite to the track assembly 1. As seen in FIG. 3 through FIG. 6, the retention housing 5 and the weight bar 6 are positioned normally across the length of the track assembly 1.

Figure 3:
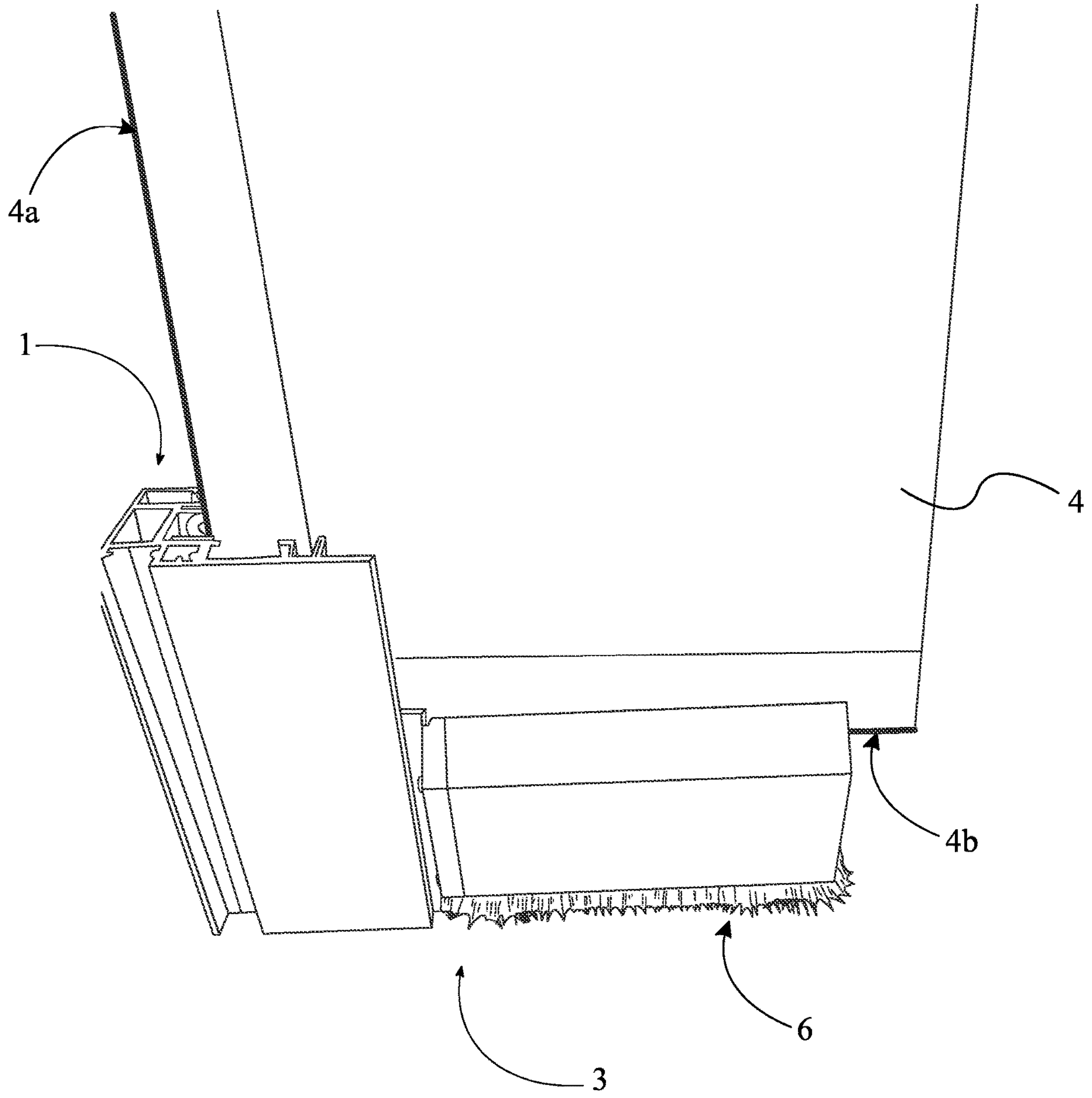
FIG. 3 is a top-front perspective view of the present invention.
Figure 4:
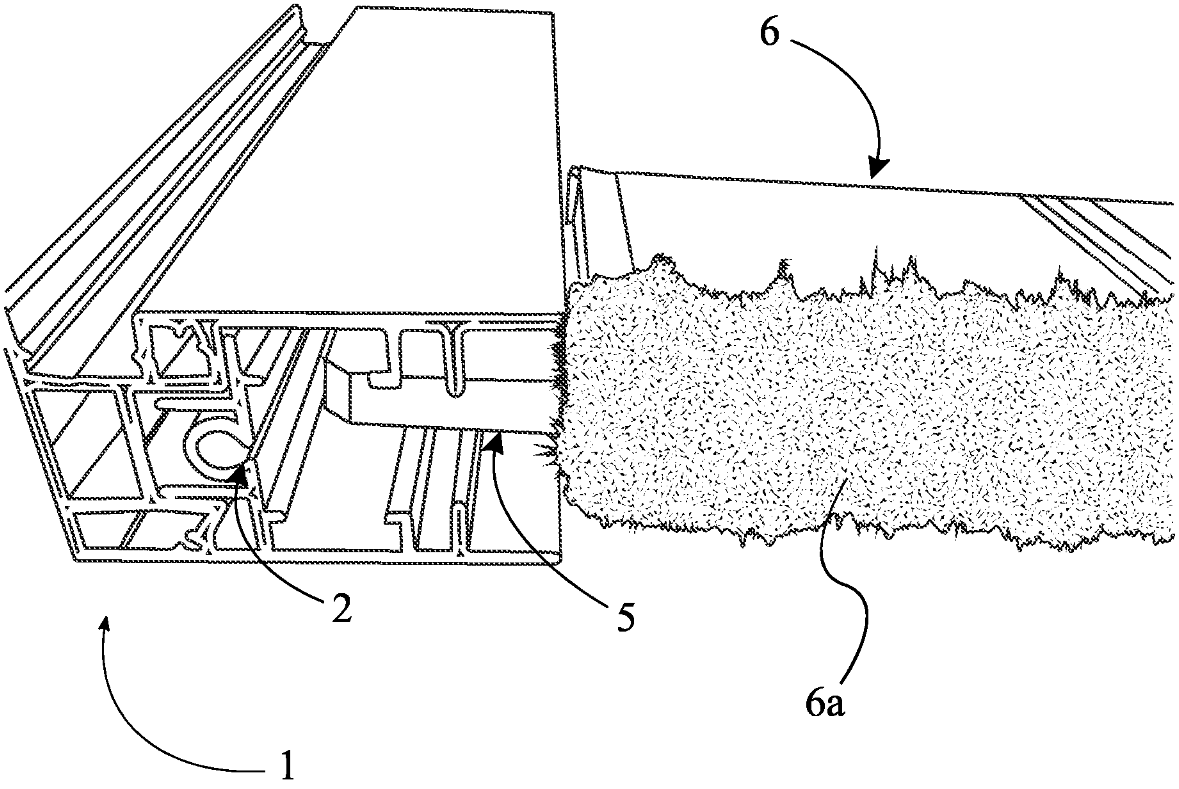
FIG. 4 is a bottom perspective view of the present invention.
Figure 5:
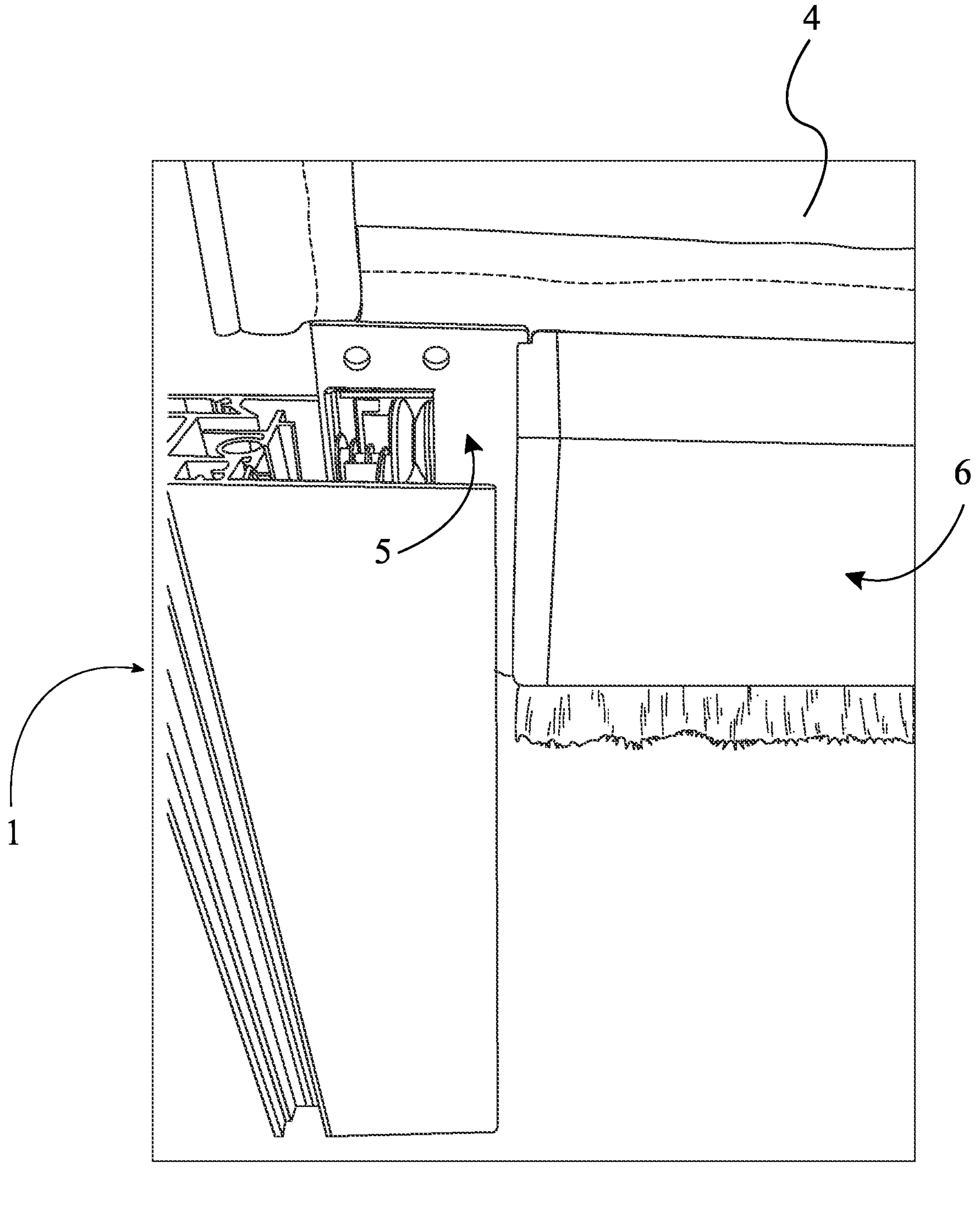
FIG. 5 is a top-front perspective view of the present invention, wherein the sliding assembly and retractable screen are positioned at a top end of the track assembly.
Figure 6:
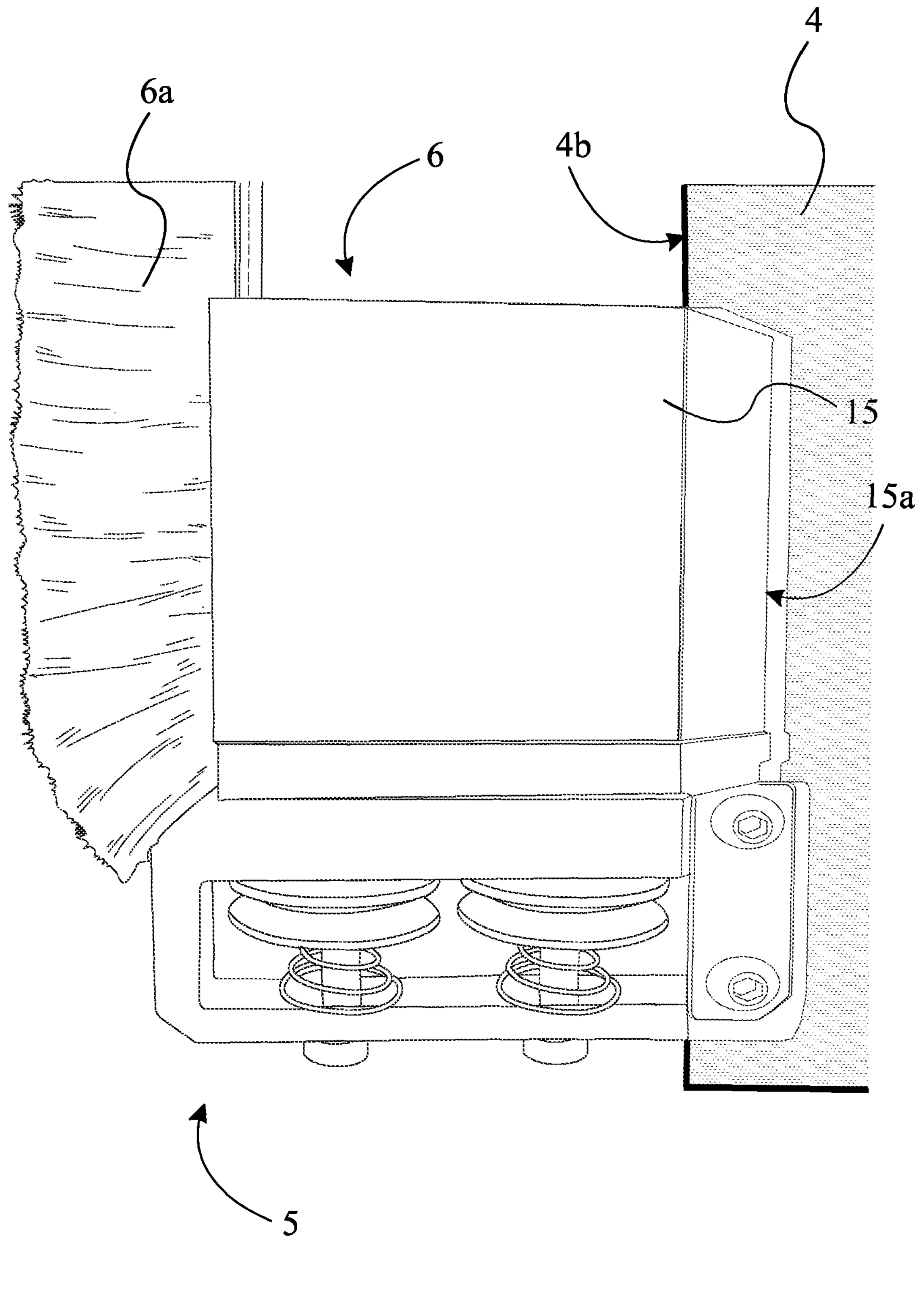
FIG. 6 is a front elevational view of the sliding assembly and the screen, shown at a 90 degrees offset orientation from the length of the track assembly.

Preferably, the screen 4 is a protective flexible fabric that may be rolled and retracted to fit within the weight bar 6. Examples of such screen materials include, but are not limited to mesh, poly carbon, transparent, thin metal etc. However, the screen 4 may comprise any other material, components, and arrangement of components that are known to one of ordinary skill in the art, as long as the intents of the present invention are not altered. As seen in FIG. 3 and FIG. 6, a first terminal edge 4*a* of the screen 4 is engaged within the guiding rail 2 and a second terminal edge 4*b* of the screen 4 is engaged within the sliding assembly 3, such that the screen is able to move vertically parallel to the track assembly 1 without displacement.

Figure 8:
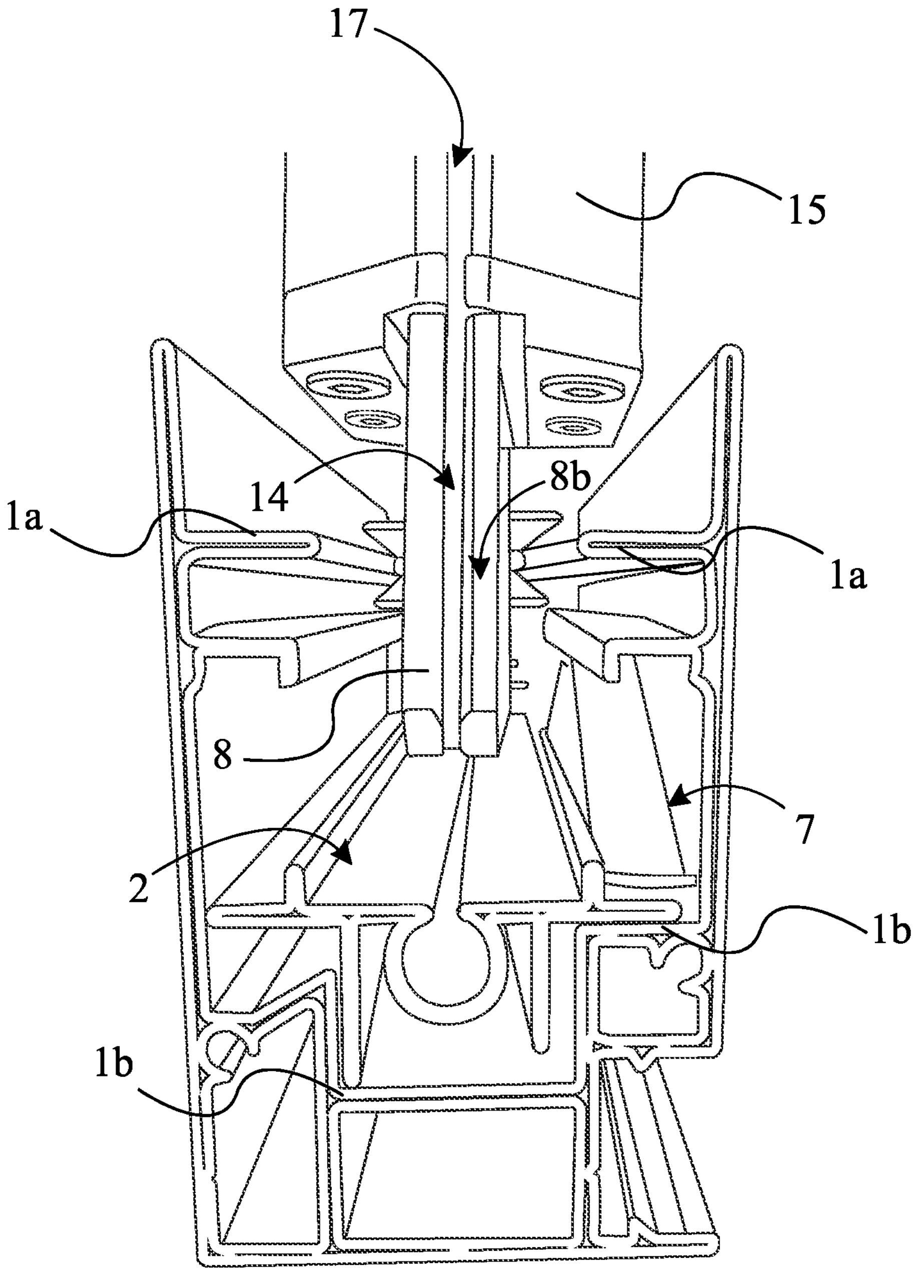
FIG. 8 is a top plan view of the track assembly and the sliding assembly.

A more detailed description of the components of the present invention follows. As clearly seen in FIG. 8, the track assembly 1 comprises a plurality of first rails 1*a*, and a plurality of second rails 1*b*. In other words, the track assembly 1 has a set of lower distinctive rails and a set of upper rails. Accordingly, the plurality of first rails 1*a* is laterally offset from the plurality of second rails 1*b*. The rails are hosed by a connecting base and two parallel side walls. The plurality of first rails 1*a* (set of upper rails) has interior rails that are parallel as well as structurally mirrored between the two walls. The plurality of second rails 1*b* (set of lower rails) does not have a mirrored structure like the set of upper rails as can be seen in FIG. 2 and FIG. 8. The plurality of second rails 1*b* is structured asymmetrically so that the guiding rail 2 may be tilted and easily installed within the tracking assembly 1. Additionally, the track assembly 1 may have at least one fastener covering 1*c*, as seen in FIG. 2. The fastener cover 1*c* is detachably mounted onto the track assembly 1, such that the fasteners used on the track assembly 1 to mount the various components of the present invention may be covered, thereby providing an aesthetically appealing look to the present invention. According to the preferred embodiment and as seen in FIG. 2, the retention housing 5 is detachably connected in between the plurality of first rails 1*a*, and the guiding rail 2 is detachably connected between the plurality of second rails 1*b*. In other words, the plurality of first rails 1*a* holds or supports the retention housing 5, and the plurality of second rails 1*b* hold the guiding rail 2 within the track assembly 1.

Figure 10:
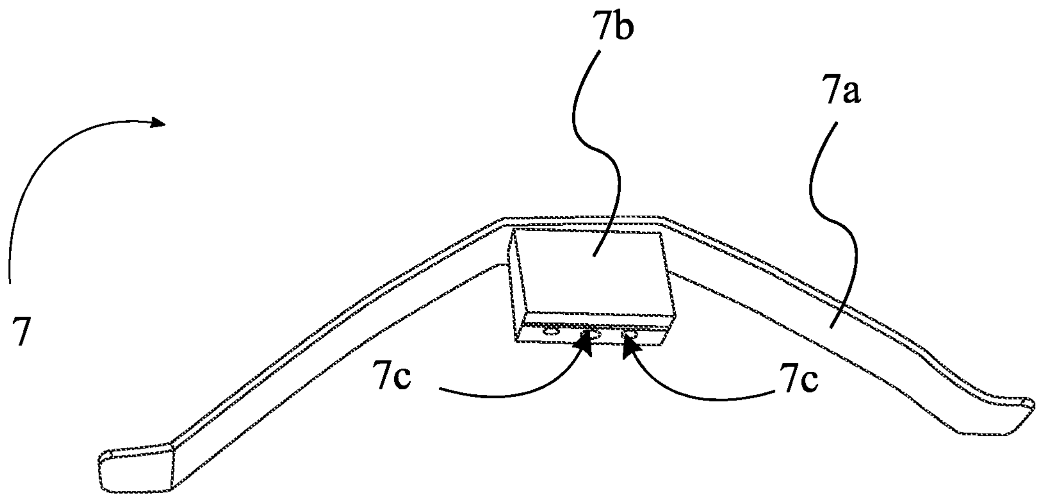
FIG. 10 illustrates a perspective view of the first spring.

In order to provide flexibility to the sliding assembly 3, the present invention comprises a plurality of first springs 7. In reference to FIG. 2, the plurality of first springs 7 is mounted between the guiding rail 2 and the plurality of first rails 1*a*. As seen in FIG. 10, the plurality of first springs 7 are flexible supportive pieces that allow for movement and flexibility of the retention housing 5 and thus does not ruin the components of the present invention. Accordingly, multiple sets of the plurality of first springs 7 may be mounted along the length of the track assembly 1 for providing the desired flexibility and stability to the screen retention system.

Figure 9:
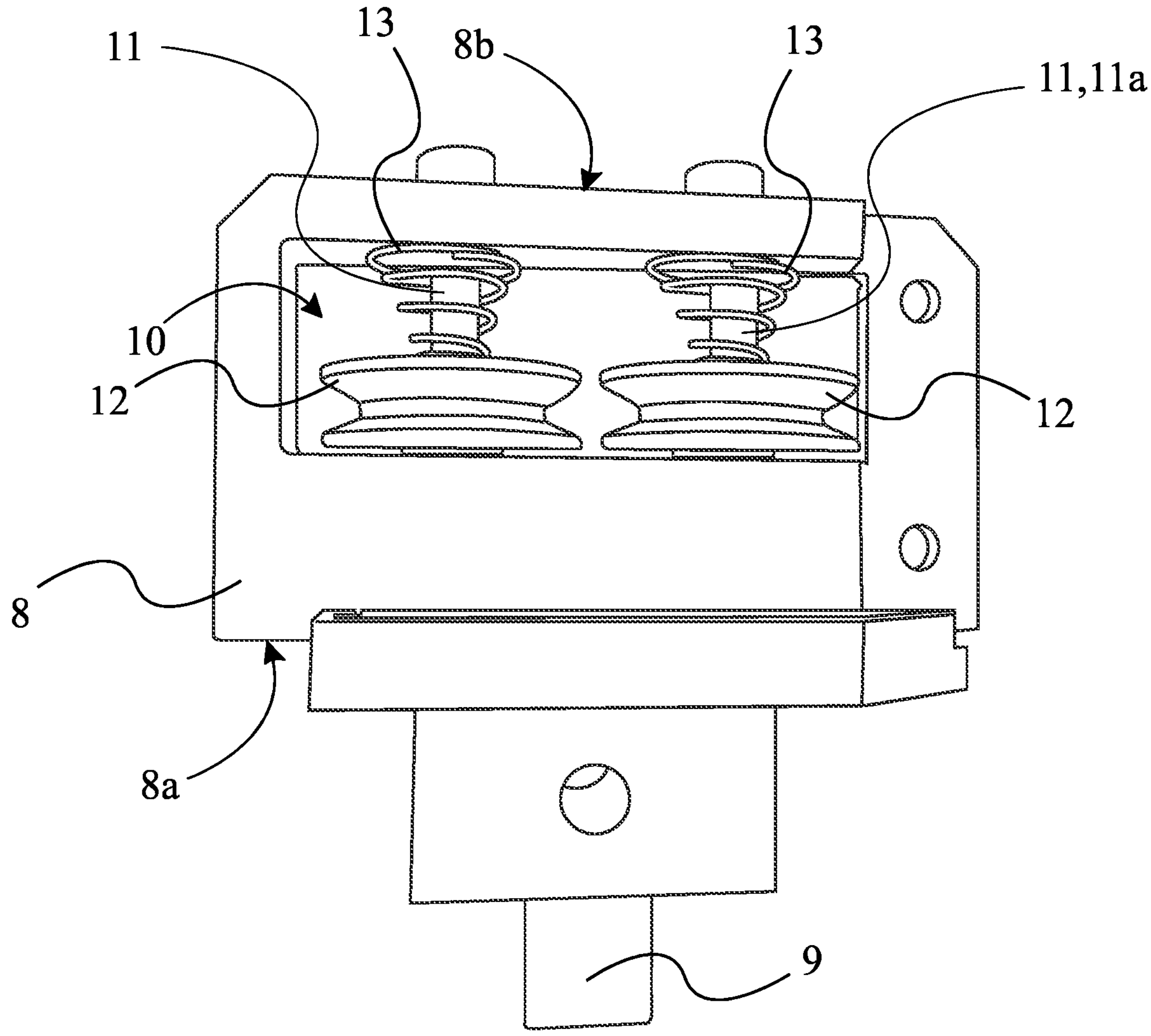
FIG. 9 is a front elevational view of the retention housing.

In reference to FIG. 9, the retention housing 5 comprises a body 8, an end cap 9, a cavity 10, a plurality of shafts 11, a plurality of sliding members 12, a plurality of second springs 13, and a first screen channel 14. Preferably, the body 8 of the retention housing 5 is as a rectangular plate with a cutout center or cavity 10. To that end, the cavity 10 laterally traverses through the body 8 and the cavity 10 takes approximately a third of the surface area of the body 8 as can be seen in FIG. 8. In the preferred embodiment, the cavity 10 is rectangular. However, the cavity 10 may comprise any other size, shape, orientation etc. as long as the objectives of the present invention are fulfilled. More specifically, the cavity 10 is centered towards a long edge of the body 8. The cavity 10 houses the set of sliding members and the set of springs. To accomplish this, the plurality of shafts 11 is mounted within the cavity 10, and each of the plurality of sliding members 12 and each of the plurality of second springs 13 are threaded through a corresponding shaft 11*a*, wherein the corresponding shaft 11*a* is from the plurality of shafts 11. There exist two shafts that holds the set of sliding members and the set of springs. Note that the plurality of sliding members 12 and the plurality of second springs 13 are used to allow movement of the weight bar 6 and to retain and keep components in the boundaries. In other words, the plurality of second springs 13 on the retention housing 5 allows for deflection (during winds, or any other slight forces acting on the screen), but they keep the screen 4 from popping out of the track assembly 1. Further, the plurality of sliding members 12 of retention housing 5 allows the screen 4 to move up and down (if it hits any obstacles) and thus allows for angled retention of the screen 4, thereby not messing up the system. The plurality of shafts 11 is evenly spaced and connected normal to the long edges of the cavity 10. As seen in FIG. 2, the plurality of sliding members 12 is engaged between the plurality of first rails 1*a*. In the preferred embodiment, the plurality of sliding members 12 comprises U-grooved wheels, as clearly seen in FIG. 6. However, the plurality of sliding members 12 may comprise V-grooved wheels, or even blocks or various shapes having grooves that may engage the plurality of first rails 1*a*. Thus, the retention housing 5 maybe inserted by means of the plurality of sliding members 12 into the plurality of first rails 1*a* of the track assembly 1.

According to the preferred embodiment, the end cap 9 is terminally mounted onto a first terminal edge 8*a* of the body 8, and the end cap 9 is positioned centrally along the first terminal edge 8*a* of the body 8. In other words, the end cap 9 is located on the long edge opposing the position of the cavity 10, as seen in FIG. 9. Preferably, the end cap 9 is an elongated rectangular knob protruding perpendicularly to the long edge of the body 8. However, the end cap 9 and the body 8 may have any other shape, size, orientation, components, arrangement of components etc. that are known to one of ordinary skill in the art, as long as the intents of the present invention are not altered. Additionally, other protruding pieces that are meant for housing fasteners are mounted along different edges of the body 8, such that the retention housing 5 may be connected with the weight bar 6. As may be clearly seen in FIG. 8, the first screen channel 14 traverses along a second terminal edge 8*b* of the body 8. This is so that, the screen 4 may be held onto or attached to the retention housing 5. In other words, the second terminal edge 4*b* of the screen 4 is detachably engaged within the first screen channel 14.

Figure 7:
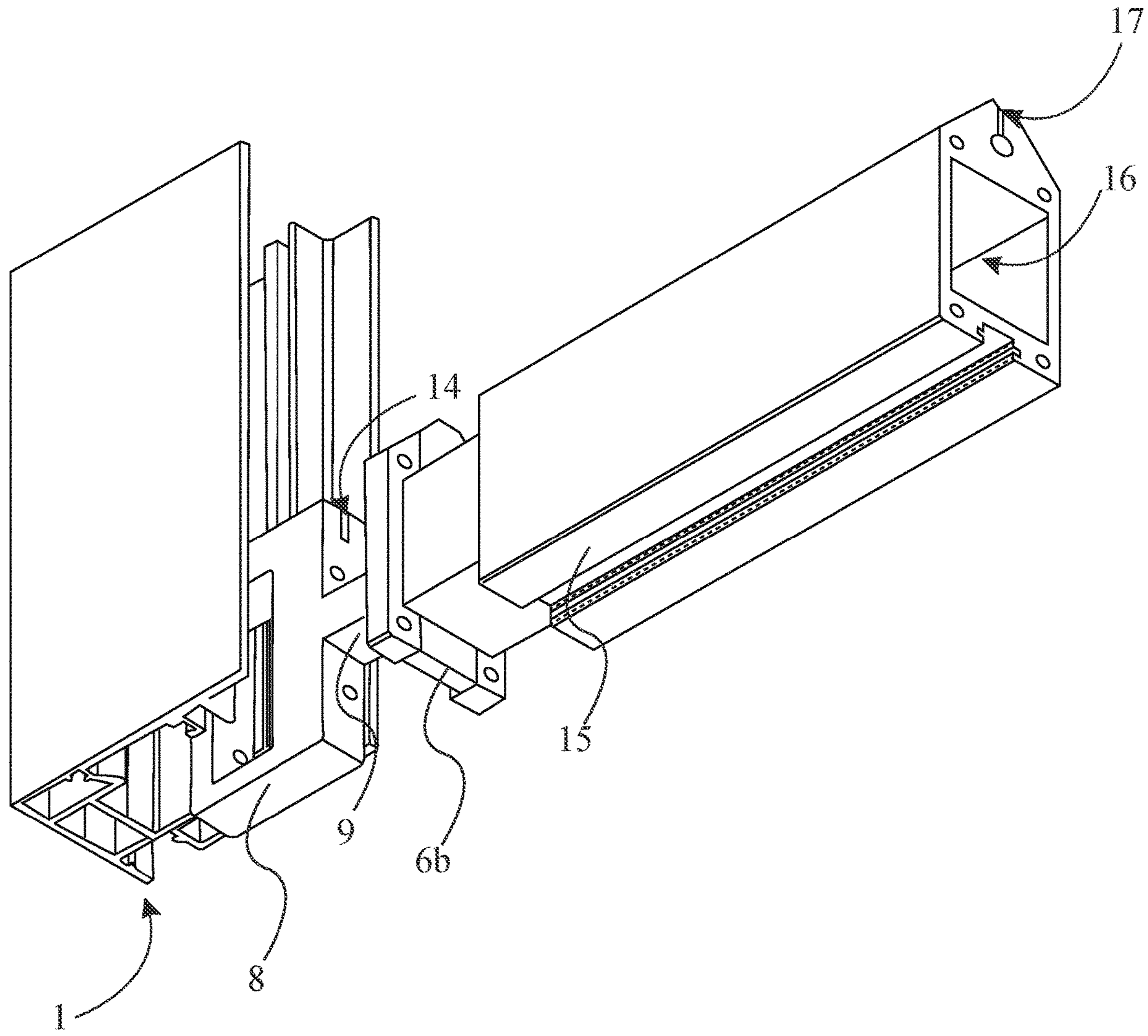
FIG. 7 is an exploded bottom perspective view of the present invention, wherein the retractable screen is not shown.

Continuing with the preferred embodiment, the weight bar 6 comprises a receptacle 15, an inner compartment 16, and a second screen channel 17. Preferably, the inner compartment 16 traverses into the receptacle 15. The inner compartment 16 is a space that can house the screen 4 rolled around a roll tube in the retracted phase and may be extended or pulled down as the weight bar 6 is pulled down and the screen 4 is in use. As seen in FIG. 7, the hollow section or inner compartment 16 runs lengthwise of the weight bar 6. In addition, the inner compartment 16 is utilized as a slot or insertional segment for the end cap 9 of the retention housing 5, as seen in FIG. 6. In order to hold in place an edge of the screen 4, the second screen channel 17 traverses along a third terminal edge 15*a* of the receptacle

15, wherein the second terminal edge 4*b* of the screen 4 is detachably engaged within the second screen channel 17. With the retention housing 5 in position, the inner compartment 16 of weight bar 6 may slide over the end cap 9 of the retention housing 5. The end cap 9 may be connected or mounted onto the weight bar 6 with the help of a bottom bar cap 6*b* as a connecting link, as seen in FIG. 7. Once the track assembly 1 and the weight bar 6 are attached with a screen 4 as shown in FIG. 3 through FIG. 6, the screen 4 is able to move vertically parallel to the track assembly 1 without any displacement. The bottom of the weight bar 6 may or may not have a brushed end 6*a* as seen in FIG. 3 through FIG. 6, depending on the location and preference of usage of the present invention.

In reference to FIG. 10, the first spring 7 is shown as comprising a flexible bow region 7*a* with a rectangular block 7*b* extruding from below a center portion of the bow region 7*a*. The bow region 7*a* provides the necessary flexibility, while the extruded rectangular block 7*b* relieves the stress on the spring and acts as a block that prevents the guiding rail 2 from popping out of the track assembly 1. Out of the plurality of holes 7*c* that are seen traversing into the rectangular block 7*b*, two outer holes help in attaching the rectangular block 7*b* to the bow region 7*a*, while the center hole helps in attaching the first spring 7 to the track assembly 1.

Figure 11:
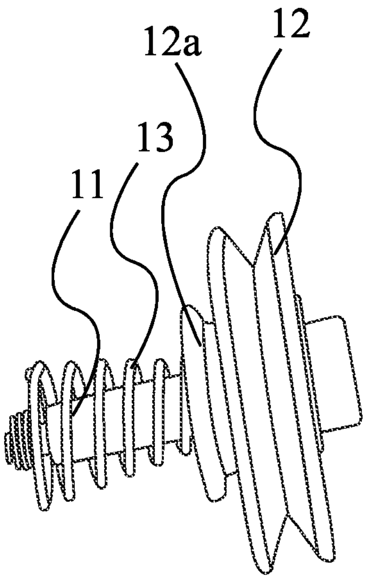
FIG. 11 illustrates a perspective view of the second spring.

As seen in FIG. 11, the wheel 12 and the second spring 13 are threaded through the shaft 11. There is also a flange bearing 12*a* positioned between the spring 13 and the wheel 12. Preferably, the flange bearing 12*a* allows for flexibility and rotation of the plurality of sliding members 12 without any friction. However, any other component and/or attachments that are known to one of ordinary skill in the art may be employed for the smooth functioning of the components of the present invention.

Figure 12:
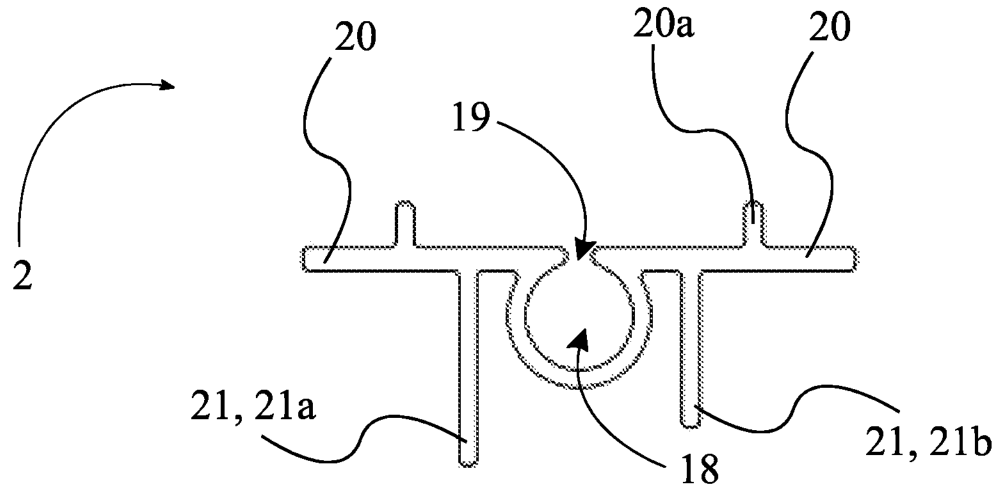
FIG. 12 illustrates a perspective view of a top view of the guiding rail.

Continuing with the preferred embodiment, the guiding rail 2 comprises a cylindrical trail 18, a third screen channel 19, a plurality of extending walls 20, and a plurality of support ledges 21, as seen in FIG. 12. In the preferred embodiment, a keder rail is shown. The keder rail may be described as an elongated piece with a cylindrical center. Accordingly, the cylindrical trail 18 extends centrally along a length of the guiding rail 2 and the cylindrical trail 18 has a small gap that does not close into a pipe-like structure. The small gap is the third screen channel 19 that is traversing into the cylindrical trail 18. The third screen channel 19 extends along the entire length of the guiding rail 2, such that the first terminal edge 4*a* of the screen 4 may be detachably engaged within the third screen channel 19. Further, the plurality of extending walls 20 extends laterally and in opposing directions from the cylindrical trail 18. In other words, there exists a plate on each side of the gap that runs straight horizontally while paralleled and mirrored. The gap or the third screen channel 19 is positioned to be tangent to the two plates. Each of the side plates or plurality of extending walls 20 has a teeth-like structure 20*a* protruding upwards as can be seen in FIG. 12. These teeth-like structures act as structural barriers or boundaries for the plurality of first springs 7, as seen in FIG. 2. The upward protruding teeth on each side are parallel and mirrored. Furthermore, the plurality of support ledges 21 extends normally from the plurality of extending walls 20 opposite to the third screen channel 19. Preferably, the plurality of support ledges 21 comprises a first support ledge 21*a* and a second support ledge 21*b*, that are asymmetrical in shape. More specifically, the peculiar shape of the underside of the guiding rail 2 is uneven. In other words, one of the support ledges is slightly longer than the opposing ledge on the other side of the cylindrical center. This is so that, the keder rail may be tilted and inserted onto the plurality of second rails 1*b* of the track assembly 1, without any obstruction or difficulty. Thus, as seen in FIG. 12, the first support ledge 21*a* is longer than the second support ledge 21*b*.

Thus, the special structural design and components of the present invention helps in keeping the screen 4 intact while providing the needed flexibility. It should be noted that any other fastening components and fastening mechanisms, such as screws, nuts, clips, clamps, bushes, magnets, hangers, etc. that may be used to secure various components of the present invention falls within the scope of the present invention.

Although the invention has been explained in relation to its preferred embodiment, it is to be understood that many other possible modifications and variations can be made without departing from the spirit and scope of the invention as hereinafter claimed.

What is claimed is:

1. A retractable screen retention system, comprising:
a track assembly;
a guiding rail;
a sliding assembly;
a screen;
the sliding assembly comprising a retention housing and a weight bar;
the guiding rail being detachably mounted within the track assembly;
the guiding rail being positioned centrally across a width of the track assembly;
the retention housing being slidably mounted along a length of the track assembly;
the weight bar being detachably connected to a terminal end of the retention housing, opposite to the track assembly;
the retention housing and the weight bar being positioned normally across the length of the track assembly;
a first terminal edge of the screen being engaged within the guiding rail and a second terminal edge of the screen being engaged within the sliding assembly;
the retention housing comprising a body, an end cap, a cavity, a plurality of shafts, a plurality of sliding members, a plurality of second springs, and a first screen channel;
the cavity laterally traversing through the body;
the plurality of shafts being mounted within the cavity;
each of the plurality of sliding members and each of the plurality of second springs being threaded through a corresponding shaft, wherein the corresponding shaft is from the plurality of shafts;
the end cap being terminally mounted onto a first terminal edge of the body;
the end cap being positioned centrally along the first terminal edge of the body; and
the first screen channel traversing along a second terminal edge of the body.

2. The retractable screen retention system of claim 1, the track assembly comprising:
a plurality of first rails;
a plurality of second rails;
the plurality of first rails being laterally offset from the plurality of second rails;
the retention housing being detachably connected between the plurality of first rails; and
the guiding rail being detachably connected between the plurality of second rails.

3. The retractable screen retention system of claim 2, comprising:

a plurality of first springs; and the plurality of first springs being mounted between the guiding rail and the plurality of first rails.

4. The retractable screen retention system of claim 1, wherein the second terminal edge of the screen is detachably engaged within the first screen channel.

5. The retractable screen retention system of claim 1, wherein the plurality of sliding members is engaged between the plurality of first rails.

6. The retractable screen retention system of claim 1, the weight bar comprising:

a receptacle;

an inner compartment;

a second screen channel;

the inner compartment traversing into the receptacle; and the second screen channel traversing along a third terminal edge of the receptacle.

7. The retractable screen retention system of claim 6, wherein the second terminal edge of the screen is detachably engaged within the second screen channel.

8. The retractable screen retention system of claim 1, wherein the guiding rail is a keder rail.

9. The retractable screen retention system of claim 1, the guiding rail comprising;

a cylindrical trail;

a third screen channel;

a plurality of extending walls;

a plurality of support ledges;

the cylindrical trail extending centrally along a length of the guiding rail;

the third screen channel traversing laterally into the cylindrical trail;

the plurality of extending walls extending laterally and in opposing directions from the cylindrical trail; and the plurality of support ledges extending normally from the plurality of extending walls opposite to the third screen channel.

10. The retractable screen retention system of claim 9, wherein the first terminal edge of the screen is detachably engaged within the third screen channel.

11. The retractable screen retention system of claim 9, comprising:

the plurality of support ledges comprising a first support ledge and a second support ledge; and the first support ledge being longer than the second support ledge.

12. A retractable screen retention system, comprising:

a track assembly;

a guiding rail;

a sliding assembly;

a plurality of first springs;

a screen;

the track assembly comprising a plurality of first rails and a plurality of second rails;

the sliding assembly comprising a retention housing and a weight bar;

the guiding rail being detachably mounted within the track assembly;

the guiding rail being positioned centrally across a width of the track assembly;

the retention housing being slidably mounted along a length of the track assembly;

the weight bar being detachably connected to a terminal end of the retention housing, opposite to the track assembly;

the retention housing and the weight bar being positioned normally across the length of the track assembly;

the plurality of first rails being laterally offset from the plurality of second rails;

the retention housing being detachably connected between the plurality of first rails;

the guiding rail being detachably connected between the plurality of second rails;

the plurality of first springs being mounted between the guiding rail and the plurality of first rails;

a first terminal edge of the screen being engaged within the guiding rail and a second terminal edge of the screen being engaged within the sliding assembly;

the retention housing comprising a body, an end cap, a cavity, a plurality of shafts, a plurality of sliding members, a plurality of second springs, and a first screen channel;

the cavity laterally traversing through the body;

the plurality of shafts being mounted within the cavity;

each of the plurality of sliding members and each of the plurality of second springs being threaded through a corresponding shaft, wherein the corresponding shaft is from the plurality of shafts;

the end cap being terminally mounted onto a first terminal edge of the body;

the end cap being positioned centrally along the first terminal edge of the body; and the first screen channel traversing along a second terminal edge of the body.

13. The retractable screen retention system of claim 12, wherein the plurality of sliding members is engaged between the plurality of first rails.

14. The retractable screen retention system of claim 12, the weight bar comprising:

a receptacle;

an inner compartment;

a second screen channel;

the inner compartment traversing into the receptacle; and the second screen channel traversing along a third terminal edge of the receptacle.

15. The retractable screen retention system of claim 14, wherein the second terminal edge of the screen is detachably engaged within the second screen channel.

16. The retractable screen retention system of claim 12, wherein the guiding rail is a keder rail.

17. The retractable screen retention system of claim 12, the guiding rail comprising;

a cylindrical trail;

a third screen channel;

a plurality of extending walls;

a plurality of support ledges;

the cylindrical trail extending centrally along a length of the guiding rail;

the third screen channel traversing laterally into the cylindrical trail, wherein the first terminal edge of the screen being detachably engaged within the third screen channel;

the plurality of extending walls extending laterally and in opposing directions from the cylindrical trail; and the plurality of support ledges extending normally from the plurality of extending walls opposite to the third screen channel.

* * * * *